United States Patent
Barriga et al.

(10) Patent No.: US 9,252,959 B2
(45) Date of Patent: Feb. 2, 2016

(54) CHALLENGING A FIRST TERMINAL INTENDING TO COMMUNICATE WITH A SECOND TERMINAL

(75) Inventors: Luis Barriga, Bandhagen (SE); Michael Liljenstam, Solna (SE); Mats Naslund, Bromma (SE); Per-Olof Nerbrant, Osterskar (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 356 days.

(21) Appl. No.: 13/320,328

(22) PCT Filed: May 20, 2009

(86) PCT No.: PCT/SE2009/050585
§ 371 (c)(1),
(2), (4) Date: Nov. 14, 2011

(87) PCT Pub. No.: WO2010/134862
PCT Pub. Date: Nov. 25, 2010

(65) Prior Publication Data
US 2012/0059897 A1    Mar. 8, 2012

(51) Int. Cl.
| | |
|---|---|
| G06F 15/16 | (2006.01) |
| H04L 9/32 | (2006.01) |
| H04W 12/06 | (2009.01) |
| H04W 76/02 | (2009.01) |
| H04L 29/06 | (2006.01) |
| G06Q 10/10 | (2012.01) |
| G06F 21/31 | (2013.01) |
| H04W 48/16 | (2009.01) |

(52) U.S. Cl.
CPC .............. *H04L 9/3271* (2013.01); *G06F 21/31* (2013.01); *G06Q 10/107* (2013.01); *H04L 63/08* (2013.01);
(Continued)

(58) Field of Classification Search
CPC ................ H04L 12/585; H04L 9/3271; H04L 2209/805; H04L 63/08; G06Q 10/107; H04W 12/06; H04W 48/16; H04W 76/02; G06F 2221/2133

USPC .......................................................... 709/206
See application file for complete search history.

(56) References Cited

U.S. PATENT DOCUMENTS

| | | | |
|---|---|---|---|
| 8,620,315 B1 * | 12/2013 | Merritt et al. .............. 455/435.1 |
| 2004/0162110 A1 | 8/2004 | Neuhaus |

(Continued)

FOREIGN PATENT DOCUMENTS

WO    2008030363 A2    3/2008

OTHER PUBLICATIONS

Gritzalis, et al., "A SIP-oriented SPIT Management Framework", Computers & Security, Oct. 1, 2008, vol. 27, pp. 136-153.

(Continued)

*Primary Examiner* — June Sison
*Assistant Examiner* — Steven Nguyen
(74) *Attorney, Agent, or Firm* — Patent Portfolio Builders, PLLC (57) ABSTRACT

The invention relates to a method, party challenging device (18) and computer program products for providing a challenge to a first terminal (10) intending to communicate with a second terminal (24) via two networks (N1, N2). The party challenging device receives a first electronic message (1M) concerning a transfer of media from the first terminal to the second terminal sent from the first terminal (10) and addressed to the second terminal (24), obtains communication contextual data associated with the first party or the first terminal, provides an electronic challenge message (CHM) including a challenge (CHl1) based on the obtained data and sends the challenge message to the first terminal in order to enable a decision to be made how to process the invitation message for the second terminal based on the correctness of a response (RM) including a response to the challenge.

29 Claims, 4 Drawing Sheets

(52) U.S. Cl.
CPC .............. *H04W 12/06* (2013.01); *H04W 76/02* (2013.01); *G06F 2221/2133* (2013.01); *H04L 2209/805* (2013.01); *H04W 48/16* (2013.01)

(56) References Cited

U.S. PATENT DOCUMENTS

| | | | |
|---|---|---|---|
| 2007/0179905 A1* | 8/2007 | Buch et al. | 705/75 |
| 2008/0189360 A1* | 8/2008 | Kiley et al. | 709/203 |
| 2009/0044264 A1* | 2/2009 | Ramanathan et al. | 726/14 |
| 2009/0083826 A1 | 3/2009 | Baribault | |
| 2010/0201478 A1* | 8/2010 | Veen et al. | 340/3.1 |

OTHER PUBLICATIONS

Shirali-Shahreza, et al., "Dynamic CAPTCHA", Communications and Information Technologies, 2008; Conference Proceedings Article, Oct. 21, 2008, pp. 436-440.

* cited by examiner

CHALLENGING A FIRST TERMINAL INTENDING TO COMMUNICATE WITH A SECOND TERMINAL

CROSS REFERENCE TO RELATED APPLICATION(S)

This application is a 35 U.S.C. §371 National Phase Entry Application from PCT/SE2009/050585, filed May 20, 2009, designating the United States, the disclosure of which is incorporated herein in its entirety by reference.

TECHNICAL FIELD

The invention relates to providing challenges in relation to communication initiators. More particularly, the invention relates to a method, device, computer program and computer program product for providing a challenge for a first terminal intending to communicate with a second terminal via at least one communication network.

BACKGROUND

Unsolicited communication such as SPAM is becoming an increasing problem on the Internet. While there may be many types of unwanted traffic, SPAM is usually defined to be communication which is not only unwanted, but also mass distributed. Often, this mass distribution is accomplished by automated (machine based) generation of the messages. There is a fear that SPAM will spread to telecommunication operator networks, such as fixed or mobile telecommunication operator network. Such SPAM in a telecommunication network is not only annoying to the user or party receiving it. It may also lead to network waste and possibly incorrect or seemingly unfair charging of end-users. There is also a fear that SPAM will spread to non-email services such as IP Telephony (SPAM over IP Telephony, "SpIT"), Instant Messaging (SPAM over Instant Messaging, "SpIM"), and in general to any/all IP Multimedia Subsystems (IMS) service based services.

In the case that the IMS is provided by a 3rd Generation Partnership Project (3GPP) operator, it could be argued that users will be authenticated and the perpetrator (the source of the unsolicited communication) can be identified. Still, it does not prevent SPAM/SpIM/SpIT. Also, there is need to support the case when only one (or neither) of the parties use 3GPP hosted services.

Because of this there is a need to be able to at least broadly authorize a communication initiator in a communication network in order to be able to take counter-measures for preferably stopping undesirable communication to take place. It is in this respect of interest for a party at the receiving end to have this done without being involved. However, this party at the receiving end naturally does not want to have all such communication initiating parties to be barred.

Various techniques to mitigate SPAM have been proposed. A common denominator is that the techniques are based on "challenging" the sender/initiator of the communication. The idea is either to impose a computational load on the sender's computing device by asking the sender to solve a computational puzzle thereby limiting the rate at which the sender can initiate communication, or, to give the sender a task which only a human user would be able to solve, thereby using the fact that humans have limited computing power. This will slow down the process of sending SPAM or make it expensive, since it would need the involvement of humans. The latter form of challenges can thus be seen as a form of "Turing test", in this context known as "Completely Automated Public Turing-test to tell Computers and Humans Apart" (CAPTCHA). A typical such CAPTCHA may consist of asking the user to describe a picture or video, or to summarize some "semantical" meaning of a spoken sentence. A CAPTCHA can also be the sending of an image with "warped" or twisted characters, like numbers or letters that cannot easily be identified by a machine, for instance using character recognition such as Optical Character Recognition (OCR), while being easily identifiable by a human.

A problem with computational puzzles is that it is difficult to issue a puzzle that is "suitably" hard, as it is of interest to let a legitimate sender to be able to send even if he has a "thin" device, while at the same time it is desirable to prevent malicious "spammers" from sending bulk email, even if they have a large computer cluster to assist.

CAPTCHAs have, as was mentioned earlier, been used frequently in relation to the Internet. Examples on this are given in WO 2008/030363. Here a CAPTCHA is combined with contextual background, such as data relating to an on-line application environment provided by a provider, such as an on-line payment environment. This means that a user who wants to access a service provided by a provider is presented with a CAPTCHA that has been combined with contextual data of the service provider and normally of the service itself.

CAPTCHAS in relation to various terminals including mobile telephones has also been proposed in US 2009/0083826.

There is however still a problem in how to select a good challenge, like a CAPTCHA. First of all, since it is desirable to avoid unnecessary disturbance of the party at the receiving end of the communication, all situations where the challenge is actively chosen by the receiving party are unsuitable. Furthermore, if the communication initiator is visually or hearing impaired he or she may not be able to solve a visual or audio challenge CAPTCHA. Even if a challenge that could be understood by the communication initiator is used, this communication initiator could be in a situation where the challenge is unsuitable at a given point in time. For example, if the communication initiator is "mobile", such as driving a car, it could be dangerous to distract him or her by forcing him or her to look at the screen of a terminal on which the challenge is presented. Some terminals may furthermore lack displays and then it is also impossible to view a visual challenge. In summary, there is a need for an improved way to select challenges.

SUMMARY

The invention is therefore directed towards improving the selection of challenges to be provided to parties that initiate communication.

One object of the invention is thus to provide an improved way of selecting challenges.

This object is according to a first aspect of the invention achieved through a method for providing a challenge to a first terminal intending to communicate with a second terminal via at least one communication network. In the method, which is performed in a party challenging device, a first electronic message concerning a transfer of media from the first terminal to the second terminal is received. This first electronic message is sent from the first terminal that is associated with a first party and is addressed to the second terminal. In the method communication contextual data that is associated with the first party or the first terminal is also obtained. Then an electronic challenge message is provided based on the obtained communication contextual data, where the electronic challenge message comprises a challenge to the first party, and finally the electronic challenge message is sent to the first terminal in order to enable a decision to be made on how to process the first electronic message for the second terminal based on the correctness of an electronic response message received from the first party, where the electronic response message includes a response to the challenge provided in the electronic challenge message.

The object is according to a second aspect of the invention achieved through a party challenging device for providing a challenge to a first terminal intending to communicate with a second terminal via at least one communication network. The device comprises at least one communication interface and a challenge providing unit. This challenge providing unit is configured to receive a first electronic message concerning a transfer of media from the first terminal to the second terminal, where the first electronic message is sent from the first terminal associated with a first party and is addressed to the second terminal, obtain communication contextual data associated with the first party or the first terminal, provide an electronic challenge message based on the obtained communication contextual data, where the electronic challenge message comprises a challenge to the first party, and send the electronic challenge message to the first terminal. In this way a decision is enabled to be made on how to process the first electronic message for the second terminal based on the correctness of an electronic response message received from the first terminal, which electronic response message includes a response to the challenge provided in the electronic challenge message.

The above-mentioned object is according to a third aspect of the invention solved through a computer program comprising computer program code. When the code runs on a party challenging device for providing a challenge to a first terminal intending to communicate with a second terminal via at least one communication network, it causes the party challenging device to: receive a first electronic message concerning a transfer of media from the first terminal to the second terminal, where the first electronic message is sent from the first terminal associated with a first party and is addressed to the second terminal, obtain communication contextual data associated with the first party or the first terminal, provide an electronic challenge message based on the obtained communication contextual data, where the electronic challenge message includes a challenge to the first party, and send the electronic challenge message to the first terminal. In this way a decision is enabled to be made regarding how to process the first electronic message for the second terminal based on the correctness of an electronic response message received from the first terminal, which electronic response message includes a response to the challenge provided in the electronic challenge message.

The above-mentioned object is according to a fourth aspect of the invention solved through a computer program product comprising a computer program according to the third aspect and a computer readable means on which the computer program is stored.

The invention has many advantages. Challenges generated according to the principles of the invention consider the ability of the first party and first terminal to actually present and respond to a challenge. These capabilities and abilities may vary considerably between different parties. This increases the probability of an honest first party to actually succeed in communicating with a second party that is associated with the second terminal. This may be done with marginal reduction of the territorial privacy of the second party. Territorial privacy is here the right of the second party to be left alone. This is furthermore done without the second party needing to get actively involved in generating challenges.

According to one variation of the invention there are different types of electronic challenge messages.

Therefore the step of providing an electronic challenge message that is based on the obtained communication contextual data in the method involves determining a challenge message type based on the obtained contextual data.

For the same reason the challenge providing unit is further configured, when providing an electronic challenge message that is based on the obtained communication contextual data, to determine a challenge message type based on the obtained contextual data.

For this reason also the computer program code of the computer program further makes the party challenging device to, when providing an electronic challenge message that is based on the obtained communication contextual data, determine a challenge message type based on the obtained contextual data.

According to another variation of the invention the communication contextual data comprises collected mobility data of the first terminal. This collected mobility data may comprise position data of the first terminal. It may also comprise movement data of the first terminal. This allows the selection of challenge also to be influenced by factors such as the speed with which the first terminal moves.

According to another variation of the invention the step of providing an electronic challenge message that is based on the obtained communication contextual data involves selecting information for inclusion in the electronic challenge message based on the collected mobility data. According to this variation the challenge providing unit in the party challenging device is further configured to, when providing an electronic challenge message that is based on the obtained communication contextual data, select information for inclusion in the electronic challenge message based on the communication contextual data. According to this variation the computer program code in the computer program further makes the party challenging device to, when providing an electronic challenge message that is based on the obtained communication contextual data, select information for inclusion in the electronic challenge message based on the communication contextual data. This allows the collected mobility data to influence the content of the challenge, which allows a challenge to be based on geographical location.

According to yet another variation of the invention the communication contextual data includes challenge presentation capability defining data. At least some challenge presentation capability defining data may also relate to the challenge presentation capability of the first terminal, which provides a good basis for selecting the right type of challenge.

According to a further variation of the invention, the method further comprises the step of providing the first terminal with presentation settings adapted to the challenge presentation capability of a presentation device to be used by the first terminal for presenting the challenge. For the same reason the challenge providing unit in the party challenging device is further configured to provide the first terminal with presentation settings adapted to the challenge presentation capability of a presentation device to be used by the first terminal for presenting the challenge. For this reason also the computer program code of the computer program further makes the party challenging device provide the first terminal with presentation settings adapted to the challenge presentation capability of a presentation device to be used by the first terminal for presenting the challenge. This allows further refinement in the presentation and selection of challenges and challenge types.

According to another variation of the invention at least some challenge presentation capability defining data relates to a further terminal associated with the first party. The communication contextual data may here also include data identifying a separate communication channel to the further terminal. This variation allows a part of a challenge to be presented on the first terminal and another part on the further terminal.

According to another variation of the invention, the method further comprises the step of receiving communication contextual data from the first terminal. According to this variation the challenge providing unit in the party challenging device is further configured to receive communication contextual data from the first terminal. For this reason also the computer program code in the computer program further makes the party challenging device to receive communication contextual data from the first terminal.

According to a further variation of the invention, the method further comprises the step of receiving communication contextual data from at least one communication contextual data providing node in the at least one communication network. For the same reason the challenge providing unit in the party challenging device is further configured to receive communication contextual data from at least one communication contextual data providing node in the at least one communication network. For this reason also the computer program code of the computer program further makes the party challenging device receive communication contextual data from at least one communication contextual data providing node in the at least one communication network.

Here one communication contextual data providing node may be a mobility data collection node and the communication contextual data received from this mobility data collection node may comprise radio network measurements regarding the first terminal. This allows the provision of for instance mobility data from a network for selecting type of challenge. In this way the selection of type of challenge may be based on reliable mobility data.

One communication contextual data providing node may be a communication contextual data storage node and the communication contextual data may comprise data identifying previous challenges or types thereof and communications in relation to the first terminal.

According to a further variation of the invention, the communication contextual data comprises session type identifying data, which may be included in the first electronic message.

According to yet another variation of the invention, the method further comprises the step of receiving the electronic response message, determining the correctness of the response and treating the first electronic message according to policy rules provided for correct responses if the response is correct and otherwise treating the first electronic message according to policy rules provided for incorrect responses. Here the challenge providing unit in the party challenging device is further configured to receive the electronic response message, determine the correctness of the response and treat the first electronic message according to policy rules provided for correct responses if the response is correct and otherwise treat the first electronic message according to policy rules provided for incorrect responses. Also the computer program code in the computer program further makes the party challenging device to receive the electronic response message, determine the correctness of the response and treat the first electronic message according to policy rules provided for correct responses if the response is correct and otherwise treat the first electronic message according to policy rules provided for incorrect responses.

According to a further variation the communication contextual data includes challenge preference data provided by the first party.

The challenge may finally be a message of the type completely automated public Turing-test to tell computers and humans apart (CAPTCHA).

Communication contextual data may be data providing a context regarding the specific communication that the first party initiates, such as data identifying type of communication session. It may also be other types of contextual data associated with the first party, such as the challenge presentation capability of the first terminal, any other functionality provided in the first terminal or identification of a further terminal associated with the first party as well as the challenge presentation capability of this further terminal. It can also be other communication capabilities of the first party such as if he or she has access to a further communication channel for at least a part of the challenge. However, it may also be data indicating successfully solved challenges or types thereof relating to previous communications of the first party. It may also include other contextual data which the first party has voluntarily provided to a network, i.e. challenge preference data, such as preferred challenge types and other preferences.

A terminal associated with a party, may be a terminal belonging to the party. However, it may also be a terminal that the party has full access to but belonging to another person or entity that the party has a relation to, such as a relative or an employer.

It may furthermore be a terminal that a party uses at one specific point in time for instance through temporarily borrowing or renting the terminal, such as renting a computer on an Internet café.

A challenge message type is an indication of the type of media or combinations of different types of media that is/are to be used for presenting a challenge. A challenge message type can therefore indicate any single media type or combination of media types, like text, audio, video and still and moving image.

Mobility data of a terminal is here data that concerns the mobile character of the terminal such as position data indicating the position of the terminal and movement data such as speed and direction of movement.

Challenge presentation capability defining data is communication contextual data that specifies the capability of a terminal to present challenges. The challenge presentation capability defining data may include data defining such things as if the terminal is mobile or fixed, what challenge presentation units it includes, such as a speaker, a display or a vibrator. Here the challenge presentation capability defining data can also specify the properties of such units, such as the size and resolution of a display.

Policy rules provided for correct responses to challenges are rules that a second party associated with the second terminal or the network with which the second terminal is associated has set up for handling of desirable communication. This may be to let communication proceed, i.e. to allow transfer of media to the second terminal. However, it may also involve diversion of the media to another entity, such as a mail box or another terminal associated with the second party, providing a busy signal or busy response based on settings made by the second party in the second terminal. These policy rules may also include settings relating to how many times alerting is to be made before diversion is to be made.

Policy rules provided for incorrect responses to challenges are rules that a second party associated with the second terminal or the network with which the second terminal is associated has set up for handling undesirable communication. This may be to stop communication from proceeding, i.e. to disallow media from transferring to the second terminal. However, it may also involve diversion of the media to another entity, such as a mail box, like a message or voice mailbox, or provide a busy signal or busy response to the first electronic message.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention is generally directed towards providing challenges to a first party or communication initiator wanting to contact a second user or second party via at least one communication network using at least one terminal.

Terminals may here be such diverse things as cellular phones, laptops, PCs, fixed phones etc. A terminal, especially in relation to the second party, may therefore be a user terminal.

Computer communication and telecommunication are nowadays converging more and more. This has the advantage in providing many telecommunication users with computer communication related services and functionality, but also the advantage of providing computer users with telecommunication services and functionality. This has made it possible for users to communicate with each other using various types of terminals and networks. These communication networks furthermore often allow many different types of communications. Such communications may be communication sessions like audio or video communication sessions. However communications may also be such things as messaging, like e-mail, SMS, MMS or Instant Messaging, Chat, Push-to-Talk, etc. In all of these various types of communications various types of (multi)media may be transferred.

However, this wealth of functionality also leads to more problems for parties that receive such communication in that they may be approached by communication initiators that they are not interested to be reached by. One reason may be because the party wanting to contact them is intrusive (e.g. telesales/marketing) or even fraudulent. Indeed, the initiator of the communication may not really be a person, but rather a computer that sends undesirable information as SPAM. Another reason why a party may not want to be contacted may be because the communication initiator is not part of the same group/community, which group may be a company of employment, nationality, social activity group such as fans of sports team, fans of a special kind of music etc.

In short there are many instances when a party equipped with a terminal, such as a user terminal or a communication terminal, does not want to receive communication or join communication sessions involving communication initiators whose type, status or identity has not been fully determined. They may however in many instances be interested in contact with some of these communication initiators when they are considered legitimate.

This situation can be solved through issuing a challenge to the communication initiator and allowing communication based on the successful solution of the challenge by the communication initiator.

It is in this regard of interest to select a challenge that the (partially) unknown communication initiator should be able to solve fairly easy if he or she is of a type with which communication may be desired. However, the challenge should be fairly hard for others to solve.

However, if the challenge is of a type that the communication initiator is unable to perceive, then even a challenge having well designed content may stop communication initiators with which communication may be desirable.

In summary, the amount of false positives (accepting communication from the "wrong" type of initiator) as well as false negatives (rejecting communication from the "right" type of initiator) should be minimized.

The invention addresses this problem.

It should here also be realized that a challenge need not only be a challenge for separating a spammer from a person. It may in some instances be of interest to discern some groups of people from other groups, for instance in order to only receive communication from a person having a certain cultural background, like a specific nationality, fans of the same sports team, having the same culture or interest in the same type of music etc.

Figure 1:
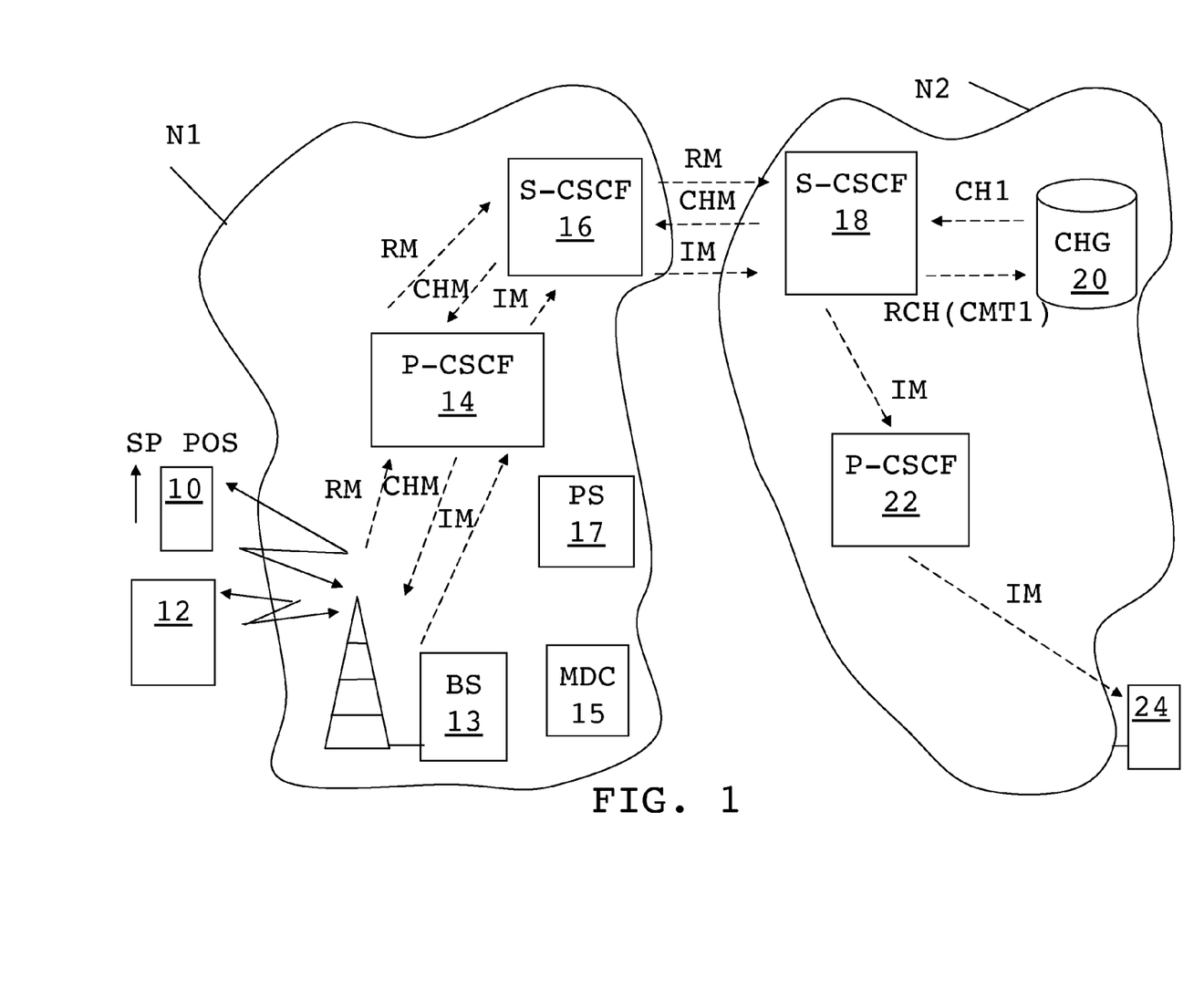
FIG. 1 schematically shows a first and a further terminal connected to a first communication network and a second terminal connected to a second communication network, where the second network includes a party challenging device according to a first embodiment of the invention.

A first embodiment of the invention will now be described in more detail in the non-limiting example context of two communication networks N1 and N2 that may be WAN (Wide Area Networks). Two networks N1 and N2 are shown in FIG. 1. The first communication network N1 is here a cellular network such as a UMTS (Universal Mobile Telecommunications System) network or an LTE (Long Term Evolution) network and the second communication network N2 is a fixed or landline network. However, the invention is not limited to these kinds of networks. The first network may for instance be a land-line network and the second network a cellular network. They can also both be of the same type, for instance land-line or cellular, and can also be computer communication networks. Even if the networks have the same type, e.g. both being cellular, they may use different technologies, e.g. N1 may be a CDMA network and N2 may be an LTE network, etc. Finally it should also be realized that the invention may also be used in relation to a single network.

To a first of the networks N1 there is connected a first terminal 10 and a further terminal 12, both being associated with a first party or communications initiator and connected to the first network N1 via a first base station 13. Here the first terminal may be a phone, such as mobile phone or a computer like a lap top computer and the further terminal may also be some of these kinds of devices. However the further terminal may also be a television set connected to the network either directly or via a set-top box (not shown). The further terminal does in such a case not have the capability to initiate communication sessions, but has a channel to the network, which can be used in some variations of the invention. These are mere examples of communication terminals that can be used together with the invention. If the first network is land-line or fixed then also the first and the further terminals may be land-line or cordless phones. Here the first terminal has a position POS and is moving with a speed SP (indicated with an arrow), which is used in some variations of the invention.

In the first communication network N1 there is a first network control node 14, here in the form of a P-CSCF (Proxy Call Session Control Function), and a second network control node 16, here in the form of a S-CSCF (Serving Call Session Control Function).

In the first network N1 there is here furthermore a mobility data collection node MDC 15 and a communication contextual data storage node in the form of a presence server PS 17. Both these nodes are examples of communication contextual data providing nodes.

To a second of the networks N2 there is connected a second terminal 24 associated with a second party and connected to the second network N2. This terminal may be a user terminal, such as a fixed or cordless phone. However, it may also be a computer and a mobile phone in case the second network N2 was cellular.

In the second communication network N2 there is a third network control node 22, also here in the form of a P-CSCF, and a fourth network control node 18, also here in the form of a S-CSCF.

In this second network N2 the fourth network control node 18 is also a party challenging device according to a first embodiment of the invention. In the second network N2 there is furthermore a challenge generating unit 20, with which the fourth network control node 18 is communicating.

In FIG. 1 there are shown a number of electronic messages. First of all a first electronic message in the form of an electronic invitation message IM is sent from the first terminal 10 to the first network N1. This electronic invitation message IM is received by the network at the first base station 13, from where it is forwarded to the first network control node 14. From the from the first network control node 14 it is forwarded to the second network control node 16 and from the second network control node 16 to the fourth network control node 18. Normally, the electronic invitation message IM would be further forwarded from the fourth network control node 18 to the third network control node 22 and from the third network control node 22 to the second terminal 24, at which point the second user is normally notified of the invitation (e.g. his/her phone "rings"). However, in the present invention, the invitation message forwarding is preferably suspended as it is received by the fourth network control node 18 before forwarding the invite further.

The fourth network control node 18 is thus configured to suspend the invitation forwarding and is furthermore configured for sending a request RCH(CMT1) for a challenge to the challenge generating unit 20 and receiving a first challenge CH1 from the same unit 20, which challenge CH1 is then being sent in an electronic challenge message CHM from the fourth network control node 18 to the second network control node 16. This electronic challenge message CHM is then sent from the second network control node 16 to the first network control node 14 and from there to the first terminal 10 via the first base station 13. From the first terminal 10 an electronic response message RM is sent to the fourth network control node 18 via the first base station 13 and the first and second network control nodes 14 and 16. This communication is all being indicated as dashed arrows. The fourth network control node 18 analyzes the electronic response message RM and determines whether to resume the previously suspended invitation message forwarding as described above, or, whether to take other action. This will be described in more detail later.

Figure 2:
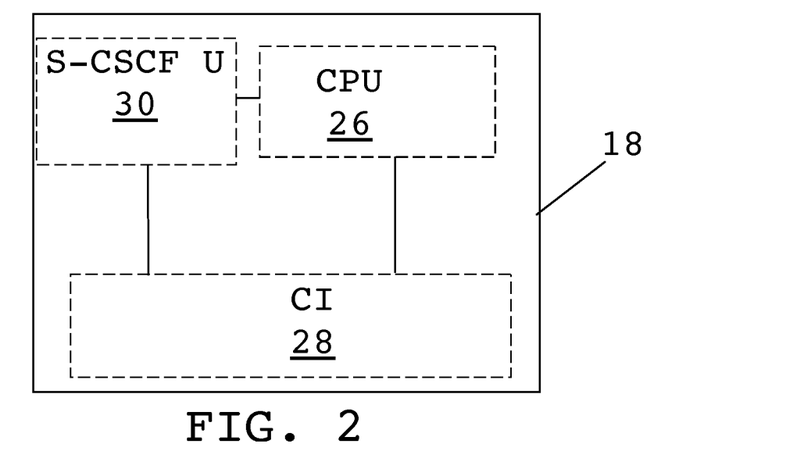
FIG. 2 shows a simplified block schematic of a party challenging device according to the first embodiment of the invention, FIG. 3 schematically shows a first electronic message in the form of a session invitation message used in the first embodiment of the invention, FIG. 4 schematically shows a field of the message in FIG. 3 that is used for selecting a challenge according to the first embodiment of the invention, FIG. 5 schematically shows an electronic challenge message according to the first embodiment of the invention.

FIG. 2 shows a block schematic of the fourth network control node 18 according to the first embodiment of the invention, which node thus here implements a party challenging device. The fourth network control node 18 includes a communication interface CI 28 for communicating in and outside of the first network. The interface 28 may be a communication interface 28 for communicating using a standardised computer communication protocol, such as TCP/IP.

The communication interface 28 is connected to a S-CSCF unit 30, which is provided for handling ordinary S-CSCF functionality as well as to a challenge providing unit CPU 26.

Figure 3:
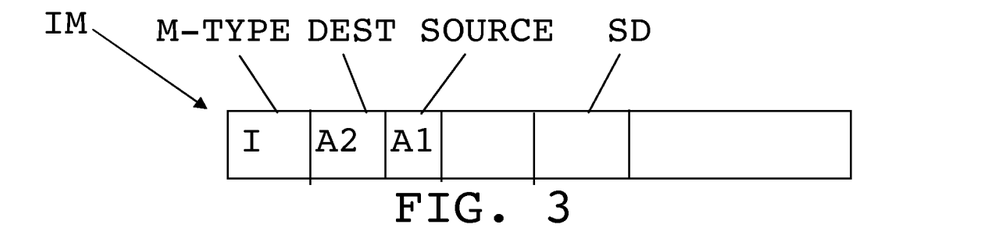

In FIG. 3 there is schematically shown an invitation message IM used in the first embodiment of the invention. The invitation message IM includes a number of fields, where there is a first message type field M-TYPE including a message type indicator. Here this indicator is I, which indicates that the message is an invitation message for a party to join a communication session. Then follows a destination address field DEST, which includes and address A2. This address is here the address of the second terminal. There is here also a source address field SOURCE including an address A1, which is the address of the first terminal. Finally FIG. 3 shows a session description field, SD. The invitation message of course also includes other fields. However these are not of interest in this first embodiment of the invention, why they are omitted. In an embodiment, the invitation message is based on the Session Initiation Protocol (SIP) and the session description is based on the session description Protocol (SDP).

Figure 4:
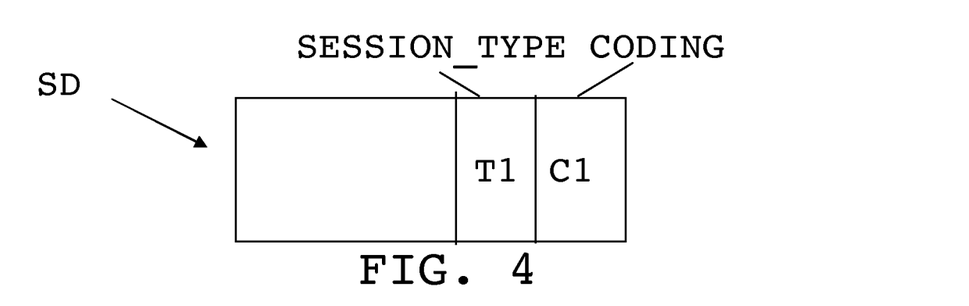

FIG. 4 schematically shows some more content of the SD field. In the SD field there is a session type subfield SESSION_TYPE here including an indication of a first type of communication session T1, which may be an indication of a voice call session, video session etc. In the SD field there is furthermore a coding subfield CODING, which includes a coding indicator C1, this indicates what type of coding is used on data in the communication sessions, such as special types of speech or video coding.

Figure 5:
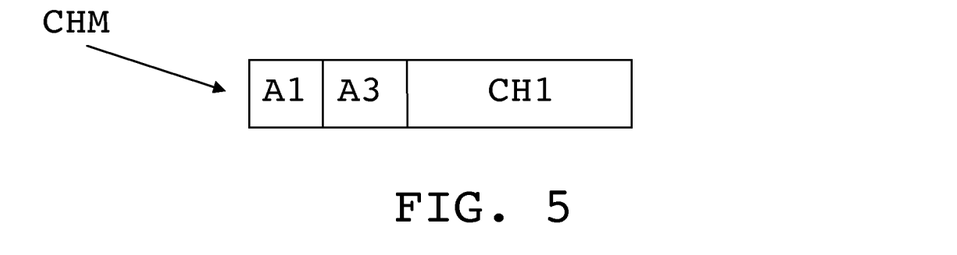

FIG. 5 schematically shows an electronic challenge message CHM according to the first embodiment of the invention. The electronic challenge message here includes a destination address field, which includes an address A1, the address of the first terminal. There is here also a source address field including an address A3, which is the address of the fourth network control node. Finally the electronic challenge message CHM has a payload where the challenge CH1 is provided.

Figure 6:
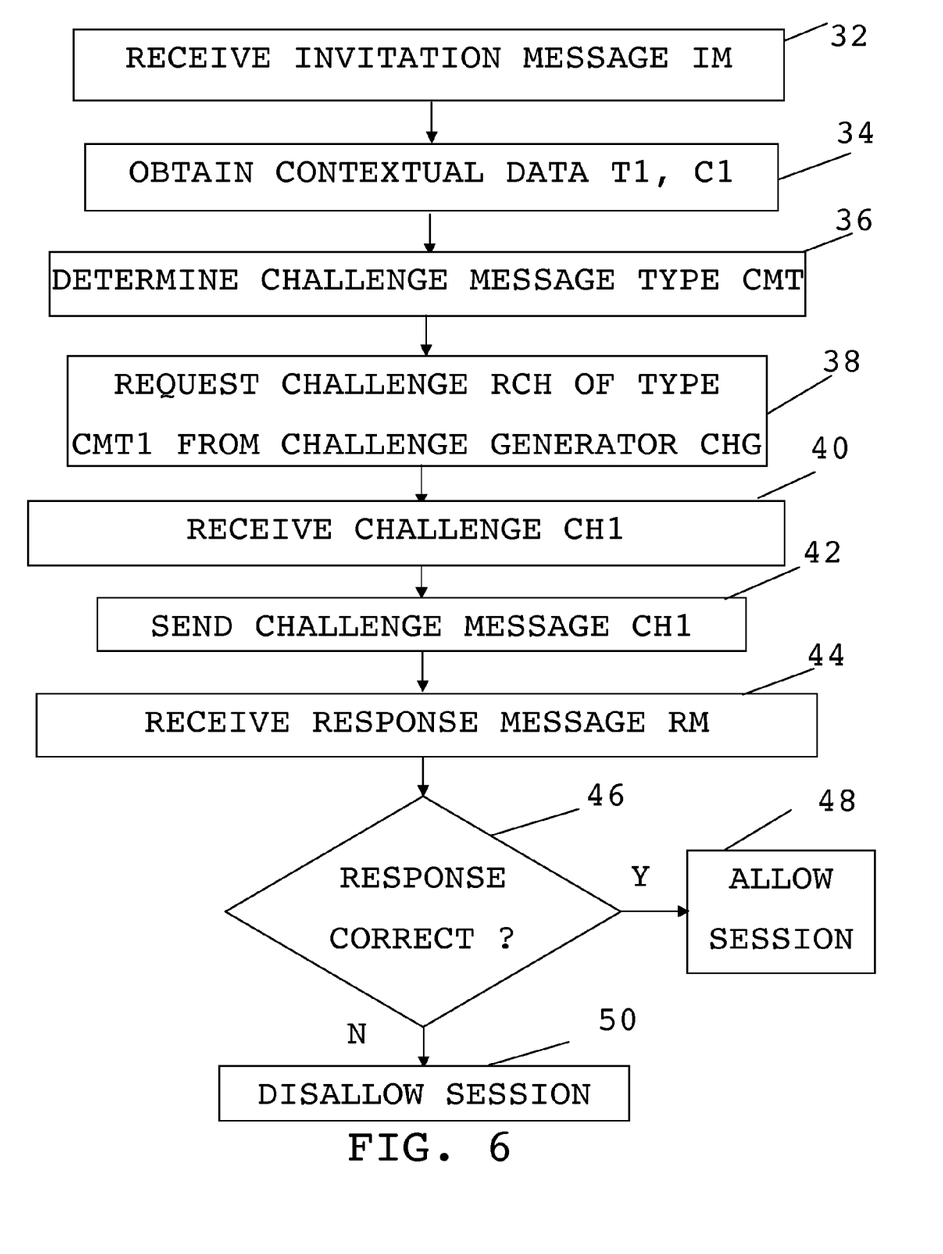
FIG. 6 shows a flow chart of a number of method steps being performed in a method for determining a challenge according to the first embodiment of the invention, FIG. 7 schematically shows an electronic challenge message according to a variation of the invention, FIG. 8 schematically shows a challenge according to another variation of the invention, FIG. 9 schematically shows a computer program module in a computer program according to a variation of the invention that performs the challenge providing functionality, and FIG. 10 schematically shows a computer program product according to an embodiment of the invention in the form of a CD ROM disc.

The functioning of the invention according to the first embodiment will now be described with reference being made to the previously described FIG. 1-5 as well as to FIG. 6, which shows a flow chart of a number of method steps being performed in a method for determining a challenge according to the first embodiment of the invention.

The first embodiment the invention is described in relation to a first electronic message concerning of a transfer of media from the first terminal to the second terminal. The first electronic message may here concern initiation of media transfer, and this message is in the first embodiment an electronic invitation message that provides an invitation to join a communication session.

All starts with a first party being associated with the first terminal 10 wanting to initiate a communication session with a second party associated with the second terminal 24. The first party may therefore make the first terminal 10 send an invitation towards the second terminal 24 of the second party to engage in a communication session, which invitation in this first embodiment of the invention is being sent in a SIP (Session Initiation Protocol) Invite message. The message is here thus an electronic invitation message that includes an invitation to engage in a communication session.

It should here be realized that from the point of view of the second party, the first party or communication initiator associated with the first terminal 10 are undetermined to him or her as well as to the second network N2. It may thus not be a known and trusted party. The first party may therefore be someone with which the second party may be interested to communicate. However this party may equally as well be a party that the second party does not wish to engage in a communication session with. It may be a spammer or some other undesirable party.

The invitation that is created in the first terminal 10 is thus addressed to the second terminal 24 associated with the second party and then sent as SIP INVITE message IM from this first terminal 10 via the first base station 13 in the first network N1 to the first network control node 14, which identifies it as an invitation message and forwards it to the second network control node 16. The second network control node 16 investigates the message type and sees that it is intended for the second terminal 24, which is handled by the second network N2. Communication in relation to this second terminal 24 in the second network N2 is handled by the fourth network control node 18. Therefore the second network control node 16 forwards the invitation message IM to the fourth network control node 18. The message IM is here received in this fourth network control node 18 via the communication interface 28. The invitation message IM may here be sent either to the S-CSCF unit 30 or to the challenge providing unit 26, where any of these may be provided with a database of authorized first parties which the invitation message IM is first checked against. In case the message is from an authorized party the S-CSCF unit 30 is to handle it and process it in normal fashion according to the SIP protocol. This authorization check is not part of the invention but is included for the sake of completeness of the description. In any case, if the message from an undetermined party is not from a authorized party it is to be handled by the challenge providing unit 26.

If the first party is not authorized, it is to receive a challenge, which challenge is directed towards establishing that the first party is in a group of parties that the second party accepts invitations to communication sessions from. This group can be as big as including all humans, i.e. in order to only avoid communications from for instance Spammers. However, the group could be a smaller group, such as persons belonging to a company, being of a certain nationality, having a common cultural or sport interest etc.

In this example the invitation message IM is not from an authorized party and therefore it is handled by the challenge providing unit 26.

The challenge providing unit 26 thus receives the invitation message, step 32, and then goes on and obtains communication contextual data associated with the first party, step 34. In this first embodiment the communication contextual data is included in the invitation message itself and in the SD field. This data is more particularly provided in the subfields SESSION_TYPE and CODING. The data in these subfields make up session type identifying data, i.e. data identifying the type of communication session that the first party wants to engage in with the second party. Therefore the challenge providing unit 26 investigates the subfields SESSION_TYPE and CODING. From the SESSION_TYPE subfield it retrieves a session type indicator T1, indicating which type of session the first party wants to engage in, such as a voice call session or a video session. This may in SIP/SDP look like T1=audio 49000 RTP/AVP 98. In this example the setting of "audio" clearly indicates that it is a voice session that is desired. This is confirmed by investigating the CODING subfield, which in this case may have a coding setting as C1=rtpmap:98 AMR/8000, where AMR means Adaptive Multirate, which is a well know speech coding technique.

From this example it can thus be gathered that the first party wants to engage in a voice communication session. A video (only) call using H261 CODEC might instead look as follows: T2=video 52230 RTP/AVP 31, C2=rtpmap:31 H261/90000, where H261 is a well-known video coding protocol.

Based on this contextual data the challenge providing unit 26 then determines a challenge message type CMT, step 36. It thus determines a challenge message type, i.e. the format in which the challenge is to be presented, which may be as an image, as audio, as video, as text, or a combination thereof. Therefore the challenge message type can also be seen as indicating which types of media are to be used for a challenge. Since the first party here wanted a voice session to be set up, the challenge providing unit 26 here determines that the challenge should be a challenge of a first challenge message type CMT1, which is here audio, i.e. that no images, text or video is to be used. In case the type was video it is actually possible to select another challenge message type than video. It is for instance possible to select text or image.

Thereafter the challenge providing unit 26 provides an electronic challenge message based on the obtained communication contextual data, which it does through connecting to the challenge generating unit 20. It thus sends a request for a challenge RCH of the identified challenge message type CMT1, step 38. This request RCH(CMT1) is sent to the challenge generating unit CHG 20 via the communication interface 28.

The challenge generating unit 20 may then generate an audio challenge, which challenge may be of the type "Completely Automated Public Turing-test to tell Computers and Humans Apart" (CAPTCHA) with a voice asking a recipient to for instance identify the source of a well known sound or to summarize a "semantical" meaning of a spoken sentence. In case of a video session, the challenge type may be an image, for instance an image including warped characters. For this reason the challenge generating unit 20 may include a database with challenges of the various types and select one according to the requested type. In this first embodiment of the invention the challenge may be generated according to known principles and may be accompanied by the solution to the challenge.

A challenge that is related to a special group, such as nationality could here be provided as an instruction "Point out your country flag", "Show where your country is on this map". However it could also be something like an instruction made in a language like "earmark the favourite dish of your country", which would look like "Señala el plato favorito de to pais" in Spanish if the nationality is Spanish. The first two challenges are typically visual, while the last may be both visual and audio. If the first party is presumed to be a fan of a certain rock group a cultural challenge may be provided through the first party getting to listen to a distorted music clip and being asked to answer if the music is a cover version of a song originally recorded by said rock group.

Because of this the challenge generating unit 20 may have access to personal data of the second party, which the first party does not have access to. It is here assumed that the second party has given consent to this use of personal data for generating challenges.

The challenge CH1 is then sent to the challenge providing unit 26 via the communication interface 28.

The challenge providing unit 26 thus receives the challenge CH1, step 40. It may here also receive the solution to the challenge. The challenge providing unit then goes on and sends the challenge in the electronic challenge message CHM, step 42. The challenge may here be accompanied by the solution or a set of acceptable solutions in case the solution is not unique.

Here the challenge may in the context of SIP be provided through using the SIP pre-condition mechanism, which is intended to be used to e.g. reserve Quality of Service (QoS) before setting up a call. In the first embodiment of the invention this mechanism is thus used to send a challenge before proceeding with setting up the communication session.

The electronic challenge message CHM may thus be provided as a SIP pre-condition response to the invitation message IM and include the challenge and possibly also the solution. This message CHM is sent to the second network control node 16, which may acknowledge the reception of it. Thereafter the electronic challenge message CHM is sent from the second network control node 16 to the first terminal 10 via the first network control node 14 and the first base station 13 for reception by the first party. In case the solution is also sent, this does not reach the first terminal 10 but stays in the second network control node 16.

The first party is prompted for a response and then generates a response to the challenge that is sent as an electronic response message RM the same way back towards the fourth network control node 18. It is thus sent via the first base station 13 and the first network control node 14 to the second network control node 16. Here it is possible that the second network control node 16 verifies that the challenge is answered correctly or not, i.e. compares the response with the solution, and then just informs the fourth network control node 18 of the correctness or incorrectness of the response, which may be done using a SIP UPDATE message, which is received by the challenge providing unit 26 via the communication interface 28. If the answer is correct the challenge providing unit 26 informs the second network control node 16 and this node proceeds with conventional session alerting activities through for instance sending a SIP RINGING message to the second network control node 16, whereupon alerting is started.

Alternatively the electronic response message RM is forwarded to the challenge providing unit 26 of the fourth network control node 18 via the communication interface 28. In this way the challenge providing unit 26 therefore receives the electronic response message, step 44. This unit 26 may then compare the response with the solution. If it does not already have it, it may fetch the solution from the challenge generating unit 20. Alternatively it may forward the solution to the challenge generating unit 20, which then verifies the response and informs the challenge providing unit 26 of the results.

Based on the correctness of the answer in the electronic response message (RM) it is then possible for the challenge providing unit 26 to make a decision on how to process the invitation message. The challenge providing unit thus analyses the response, step 46, and if the response is correct, it treats the invitation message according to policy rules provided for correct responses. This may be done through letting the S-CSCF unit 30 treat the invitation message according to the normal treatment of such messages, i.e. to resume the invitation process. In this example this involves allowing the session to be set up, step 48, why the invitation message IM is forwarded to the second terminal 24 via the third network control node 22. It should here be realized that a correct treatment may involve a diversion, for instance to a voice mail box, or some other treatment of the session that has been decided by the second party. However, if the response is not correct the challenge providing unit 26 goes on and processes the invitation according to rules set up for handling of incorrectly answered challenges. The first party may for instance be connected to a voice mail box instead of engaging in a session. However it is also possible that the session is disallowed. In the example given here the session is disallowed, step 50, which may be done through sending an electronic busy message or some other type of electronic response message for failed session set up.

In this way it is possible to avoid that the second party is bothered by undesirable invitations to communication sessions. Also, if the second party is using wireless access technology, valuable radio resources are saved. The second party need furthermore not involve him- or herself with the generation of a challenge. Furthermore, while this is done an adaptation of the type of challenge sent is made to the capabilities of the first party to be able to respond to the challenge. This raises the probability of an authorized first party to actually succeed in setting up a communication session. If for instance the first party has impaired seeing or hearing, it is possible to adapt to this fact through providing a challenge that is of a type that an honest first party would most likely be able to understand. If for instance the first party wanted to engage in a voice session, an audio challenge should be possible to understand, while if a video session was desired, a visual challenge should be possible to understand.

In this first embodiment of the invention, the fourth network control node 18 acted as a party challenging device. This is just one possible placing of this device. It can for instance be provided through the second user terminal or by other network nodes in either the first or the second network. It can for instance be implemented by an application gateway in the second network or even by a network node in the first network, such as the second network control node.

If the second network control node is to be acting as a party challenging device, the second network control node thus receives the invitation from the first terminal and then responds using a message e.g. in the HTTP 4xx-series according to IETF that includes a challenge. This response to the invitation is thus sent from the second network control node to the first terminal. As the response to the challenge is then received by the second network control node it then decides on the handling of the invitation according to the principles described above.

In the examples given above the communication contextual data was included in the actual invitation message. It should here be realized that communication contextual data is not limited to this.

The first or the second network may for instance comprise a communication contextual data storage node in the form of a network database including communication context data relating to the first party/terminal in the form of call records or call history data relating to the first party/terminal. Here also the types of challenges used and how successful the first party was in responding to these types of challenges may be stored. The challenge providing unit of the party challenging device may then access this database when receiving an invitation message from the first terminal and select a challenge of a type for which the first party previously provided a correct answer. This can furthermore be combined with investigation of if a communication session following such a successfully answered challenge exceeds a certain time limit. The exceeding of the time limit would then indicate that the first party is a party that the second party would be interested in being in contact with. This network database may be provided in either the first or the second network.

However, it may also be possible for the first party to provide other types of communication contextual data for use in relation to challenges. Such data may be a challenge preference data, such as a preference indication, i.e. an indication of the type of challenges that the first party wants to receive via the first terminal. The first party may also provide other preferences. The communication contextual data can also be challenge presentation capability defining data of the first terminal, i.e. data defining the challenge presentation capability of the first terminal. This involves providing communication contextual data such as the various capabilities of the first terminal. The challenge presentation capability defining data may include data defining such things as if the terminal is mobile or fixed, what challenge presentation units it includes, like if it includes a speaker, a display or a vibrator, what challenge response input receiving units it includes, such as keyboard, keypad, microphones and camera. Here the challenge presentation capability defining data can also specify the properties of such units, such as the size and resolution of display. The communication contextual data can also inform of other capabilities, such as mobility data collecting units, like a gyro, an accelerometer and positioning unit like a GPS positioning unit. The challenge presentation capability defining data may here also include the abovementioned type of data of another terminal 12 linked to the first party, for instance the further terminal 12 in FIG. 1.

All or some of the above described types of communication contextual data, may in one variation of the invention be registered for the first terminal on a communication contextual data storage node in the form of a presence server in the first network. One such presence server 17 is included in the first network N1 in FIG. 1. The first terminal 10 may for instance register such capability on the presence server 17 using the SIP based PRESENCE (SIMPLE) using the "User Agent Capability Extension to Presence Information Data Format (PIDF)". In case the first party has registered communication session contextual data in this way, and thereafter sends an invitation message destined for the second terminal 24, the second network control node 16, which in one variation of this scenario implements the party challenging device, may then connect to the presence server 17 for obtaining the registered data, determine type of challenge based on an analysis of the registered data and then send a challenge of a type determined through the investigation. In case the registered data included a preference indication, i.e. an indication of preferred challenge type, this may be used. In case the registered data includes challenge presentation capability defining data then a suitable challenge message type of a type that is supported by challenge presentation units defined by this capability data may be sent.

In this way it is possible to for instance learn if the first terminal lacks a display, in which case typically an audio challenge would be selected or in case it lacks a speaker, in which case a still image challenge may be selected.

In a variation of this scenario with registered first terminal capabilities the fourth network control node may implement the party challenging device. In this case the capabilities of the first terminal would normally be known solely in the first network. However, according to this variation the capabilities could be forwarded from the second network control node to the fourth network control node together with the invitation message, whereupon the fourth network control node would generate the challenge based on the received terminal capabilities or fetch the challenge from a challenge generating unit.

Figure 7:
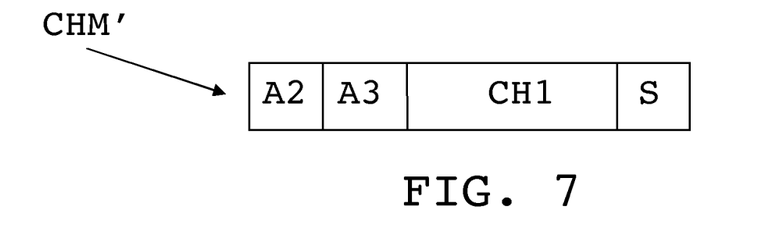

The capabilities of the first terminal to present the challenge could further include data specifying the properties of challenge presentation units, like size of display and resolution. The electronic challenge message sent by a party challenging device could because of this include both the actual challenge as well as settings for how the challenge is to be presented. An electronic challenge message CHM' according to this variation is schematically shown in FIG. 7, where the message apart form the selected challenge CH1 also includes settings S for how the challenge is to be presented. This means that the challenge providing unit of a party challenging device would first select a challenge CH1 based on earlier criteria and then provide settings adapted to the challenge presentation capability of the first terminal, such as settings relating to a challenge presentation unit, like a display. These settings would then be included together with the challenge CH1 in an electronic challenge message CHM'. Upon reception of the electronic challenge message CHM' the first terminal could then present the challenge via the specific challenge presentation unit according to the received settings S. In this way it is for instance possible that a challenge is presented on a part of a display or in one speaker of a pair of stereo speakers.

There are other ways in which such capabilities may be provided by the first terminal. These capabilities may be stored in the first terminal as a cookie and then provided to the party challenging device, either upon request or as a part of sending an invitation message. Such a cookie may also be used in relation to registering capabilities or preferences in a network node.

Communication contextual data can furthermore include mobility data of the first terminal, i.e. data relating to the movement of the first terminal, such as position data POS or movement data, such as speed SP as is shown in FIG. 1. Mobility data that is collected in relation to the first terminal 10 can then also be used for selecting type of challenge.

By for instance making several "measurements" of the first device position over time mobility of the first party can be estimated in terms of location, direction and speed.

The purpose of using this movement data could be to select a challenge which is accessible to a first party that is "on the move", for instance in order to avoid a distracting visual challenge if the first party is driving a car at high speed. It is possible to distinguish whether the first party is actually driving a car or travelling on a public transportation vessel, like a train or a bus. It could for instance be possible to use Near Field Communication (NFC) and/or Radio-frequency identification (RFID) tags on the public transportation vessel providing a vessel identity. This identity can then be detected by the first terminal using suitable sensors for such tags, such as NFC and/or RFID sensors. The first terminal (or the first network) would then provide the party challenging device with position and/or speed data together with the vessel identity. The party challenging device could then compare for instance the speed with a speed threshold and tentatively select a first challenge type, which is typically an audio challenge, since a fast moving terminal may indicate that the first party is driving. This may then be used to select an audio challenge even though the first terminal may be equipped with excellent video presentation capability. The party challenging device could then investigate if there exists any vessel identities and if there existed such an identity, it could decide to select another type of challenge, for instance an image challenge.

In one variation of the invention, this mobility data is collected by the first terminal itself. Position data could here be collected by the first terminal using a positioning unit and movement using a gyro. Movement data could also be obtained through position data, for instance through the first terminal providing a number of time stamped positions recently occupied. The data could then be sent together with an invitation to a communication session. The first terminal could also provide such data upon request from a network node or a party challenging device.

Here it should be realized that in case the first network is a cellular network, the mobility data may be collected by the network. A network node may be arranged to collect the positions of the first terminal, for instance using radio network measurements regarding the first terminal, such as triangulation between base stations or using cell identity. The positions at various points in time could then be used for obtaining movement data. The party challenging device may then connect to the network node and fetch such mobility data upon reception of an invitation to a session. Such a network node in the form of a mobility data collection node 15 is shown in FIG. 1. Note that when the mobility data is provided by the network N1 itself, higher assurance in the correctness is achieved compared to the case when the first terminal 10 itself provides its location since a fraudulent first party/terminal could attempt to provide false data, e.g. regarding its whereabouts or movement.

The first party may furthermore be equipped with a further terminal, for instance a television set that may communicate with the first network either directly or via a set top box. Such a device 12 is shown in FIG. 1. This further terminal 12 may have a separate communication channel to the communication network. The first terminal 10 may here supply the party challenging device with data about this channel and the further terminal (e.g. its network address), for instance when sending an invitation to a session. The communication contextual data may thus include data identifying a separate communication channel to the further terminal 12. The party challenging device may then send a part of the challenge to the first terminal and a part of the challenge to the further terminal. This allows the further terminal to receive at least a part of the challenge and presenting it. In this way it is for instance possible to present a visual challenge with higher resolution because of a further device having improved presentation capabilities. It also enables the provision of a visual challenge in case the first terminal lacks a display.

So far the invention has mainly been described in relation to selecting types of challenges. However, communication contextual data can also influence the content of the challenge, i.e. the information provided in a challenge.

Figure 8:
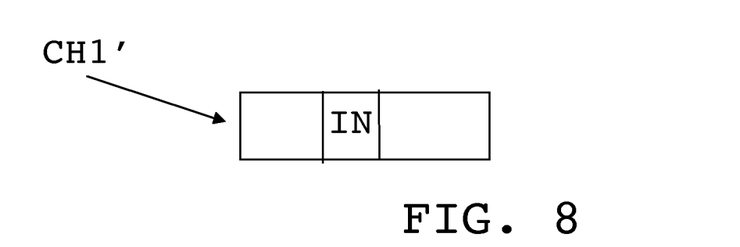

If for instance the mobility data collected in relation to the first terminal is sent to the party challenging device, this may issue a challenge having content or information being based on the collected mobility data. The party challenging device may thus select information for inclusion in the electronic challenge message based on the collected mobility data. A challenge CH1' having such information IN is schematically shown in FIG. 8. If for instance the position is received by the party challenging device, it may issue a challenge that is based on this position.

The first party may for instance be asked to describe some known, distinctive building or geological formation at the presumed position.

For this the party challenging device may have access to a classified geographical information database, where physical fixed objects at a location have been classified as "building", "mountain", "river" etc, or, more specifically as "church", "train station", etc, it is then possible for the party challenging device to present the first party with multiple-choice questions, like:

"What do you see?
a) a church
b) a river
c) a mountain
d) a train station"

Here the first party is then to select one of these choices as a response that is then being sent to the party challenging device. It is furthermore possible to also let the first party respond to a challenge by using a mobility data collection unit, such as a gyro, an accelerometer or a positioning unit. In case the first terminal for instance includes a gyro, the challenge could be to shake the first terminal up and down. The movement data detected by the gyro could then be provided as a response to the challenge.

It should be realized that the variations of functionality provided in the party challenging device described above could all be implemented in the challenge providing unit of this device. This device may here also include the challenge generating unit. It need not be provided in a network control node, but can be provided as a separate network node. It may furthermore be provided in and combined with one of the previously described communication contextual data providing nodes. The challenge providing device may especially include a mobility data collection unit configured to provide the mobility data collection functionality described above for the mobility data collection node.

The invention has above been described for a first electronic message that is an invitation message to a communication session. However, the invention is not limited to first electronic messages of this type, but may be applied on other types of first electronic messages. The first electronic message is rather a message concerning a desired transfer of media from the first terminal to the second terminal. In the first embodiment the first electronic message was an invitation message for joining a communication session. The media transferred is in this case the media being transferred when such a session is ongoing, like voice, video, images and text during the actual session between the parties. However if the first electronic message is a message according to a messaging application, like an e-mail, an SMS an MMS or an Instant Messaging message, the media transferred is media contained in the message itself, such as text, video, image or audio clips.

Figure 9:
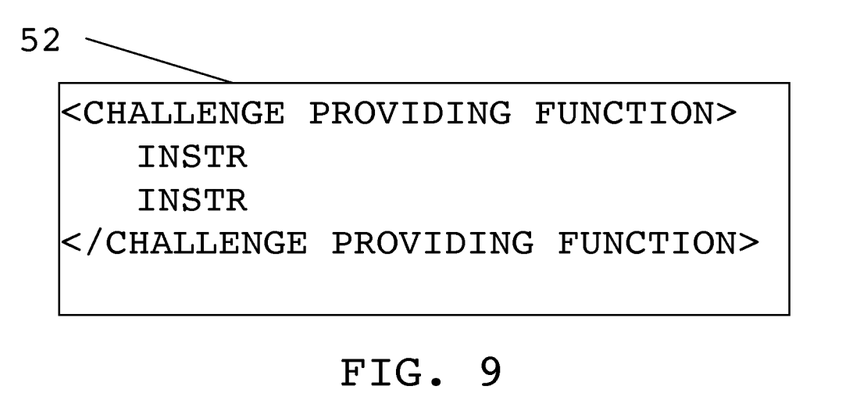

The party challenging device may with advantage be provided in the form of a processor with associated program memory including computer program code for performing the functionality of the challenge providing unit and of the challenge generating unit in case this is included. The computer program code may be pure computer program code. This is schematically displayed in FIG. 9, which shows the computer program 52. This computer program 52 includes a computer program module named CHALLENGE PROVIDING FUNCTION, which includes computer program code or instructions INSTR that implement the functionality of the challenge providing unit depicted in FIG. 2.

Figure 10:
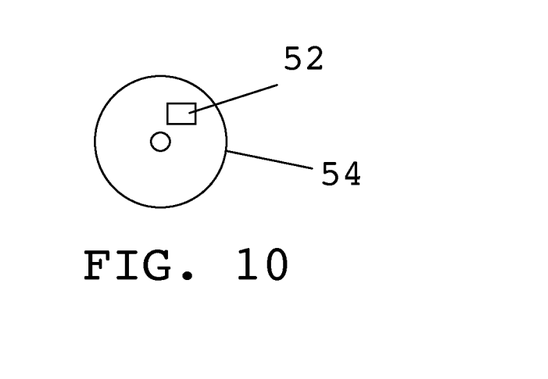

The computer program code may also be provided on a non-transitory computer readable medium, for instance in the form of a data carrier, like a CD ROM disc or a memory stick, which will implement the function of the above-described unit or units when being loaded into a computer. One such computer program product in the form of a CD ROM disc 54 with the above-mentioned computer program code 52 is schematically shown in FIG. 10.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A method for providing a challenge to a first terminal intending to communicate with a second terminal via at least one communication network, the method being performed in a party challenging device and comprising the steps of:

receiving a first electronic session initiation protocol (SIP) message concerning a transfer of media from the first terminal to the second terminal, said first electronic SIP message being sent from the first terminal associated with a first party and being addressed to the second terminal, obtaining communication contextual data associated with the first party or the first terminal, said communication contextual data comprising session type identifying data, using the communication contextual data to determine whether the first terminal is seeking to engage the second terminal in an audio only communication session;

selecting, based on the communication contextual data, a challenge message format from among a plurality of challenge message formats;

providing, in the selected challenge message format, an electronic challenge message based on the obtained communication contextual data, said electronic challenge message comprising a challenge to the first party, wherein the electronic challenge message is a message of the type completely automated public Turing-test to tell computers and humans apart (CAPTCHA), and sending said electronic challenge message to the first terminal, in order to enable a decision to be made on how to process said first electronic message for the second terminal based on correctness of an electronic response message received from the first terminal, wherein the electronic response message includes a response to the challenge provided in the electronic challenge message, wherein:

the first electronic SIP message is a session invitation message comprising a session type field storing session type information identifying a session type and a coding field storing coding information identifying a media coding type, the contextual communication data comprises one or more of the session type information and the coding information, and the step of using the communication contextual data to determine whether the first terminal is seeking to engage the second terminal in an audio only communication session comprises evaluating one or more of the session type information and the coding information to determine whether the first terminal is seeking to engage the second terminal in an audio only communication session.

2. The method according to claim 1, wherein the communication contextual data comprises collected mobility data of the first terminal.

3. The method according to claim 2, wherein the communication contextual data comprises position data of the first terminal.

4. The method according to claim 2, wherein said collected activity data comprises movement data of the first terminal.

5. The method according to claim 2, wherein the step of providing an electronic challenge message that is based on the obtained communication contextual data involves selecting information for inclusion in the electronic challenge message based on said collected mobility data.

6. The method according to claim 1, wherein the communication contextual data on which the selection of the challenge message format is based comprises challenge presentation capability defining data, such that the selection of the challenge message format is based on the challenge presentation capability defining data.

7. The method according to claim 6, wherein at least some challenge presentation capability defining data relates to the challenge presentation capability of the first terminal.

8. The method according to claim 6, comprising the step of providing the first terminal with presentation settings adapted to the challenge presentation capability of a presentation device to be used by the first terminal for presenting the challenge.

9. The method according to claim 6, wherein at least some challenge presentation capability defining data relates to a further terminal associated with the first party.

10. The method according to claim 9, wherein said communication contextual data comprises data identifying a separate communication channel to said further terminal.

11. The method according to claim 1, further comprising the step of receiving communication contextual data from the first terminal.

12. The method according to claim 1, further comprising the step of receiving communication contextual data from at least one communication contextual data providing node in the at least one communications network.

13. The method according to claim 12, wherein one communication contextual data providing node is a mobility data collection node and the communication contextual data received from this mobility data collection node comprises radio network measurements regarding the first terminal.

14. The method according to claim 12, wherein one communication contextual data providing node is a communication contextual data storage node and the communication contextual data received from this communication contextual data storage node comprises data identifying previous challenges or types thereof and communications in relation to the first party or first terminal.

15. The method according to claim 1, wherein the session type identifying data is included in the first electronic SIP message.

16. The method according to claim 1, comprising the step of receiving said electronic response message, determining the correctness of the response and treating the first electronic SIP message according to policy rules provided for correct responses if the response is correct and otherwise treating the first electronic message according to policy rules provided for incorrect responses.

17. The method according to claim 1, wherein the communication contextual data includes challenge preference data provided by the first party.

18. A party challenging device for providing a challenge to a first terminal intending to communicate with a second terminal via at least one communication network, the device comprising a non-transitory computer readable medium having instructions that, when executed by a processor, cause the party challenging device to provide:
at least one communication interface, and
a challenge providing unit configured to:
receive a first electronic session initiation protocol (SIP) message concerning a transfer of media from the first terminal to the second terminal, said first electronic SIP message being sent from the first terminal associated with a first party and being addressed to the second terminal,
obtain communication contextual data associated with the first party or the first terminal, said communication contextual data comprising session type identifying data,
using the communication contextual data to determine whether the first terminal is seeking to engage the second terminal in an audio only communication session;
select, based on the communication contextual data, a challenge message format from among a plurality of challenge message formats;
provide, in the selected challenge message format, an electronic challenge message based on the obtained communication contextual data, said electronic challenge message comprising a challenge to the first party, wherein the electronic challenge message is a message of the type completely automated public Turing-test to tell computers and humans apart (CAPTCHA), and
send said electronic challenge message to the first terminal, in order to enable a decision to be made on how to process said first electronic SIP message for the second terminal based on correctness of an electronic response message received from the first terminal, wherein the electronic response message includes a response to the challenge provided in the electronic challenge message, wherein:
the first electronic SIP message is a session invitation message comprising a session type field storing session type information identifying a session type and a coding field storing coding information identifying a media coding type,
the contextual communication data comprises one or more of the session type information and the coding information, and
the instructions cause the device to use the communication contextual data to determine whether the first terminal is seeking to engage the second terminal in an audio only communication session by evaluating one or more of the session type information and the coding information to determine whether the first terminal is seeking to engage the second terminal in an audio only communication session.

19. The device according to claim 18, wherein said challenge providing unit when providing an electronic challenge message that is based on the obtained communication contextual data is further configured to select information for inclusion in the electronic challenge message based on said communication contextual data.

20. The device according to claim 18, wherein said challenge providing unit is further configured to receive said electronic response message, determine the correctness of the response and treat the first electronic SIP message according to policy rules provided for correct responses if the response is correct and otherwise treat the first electronic SIP message according to policy rules provided for incorrect responses.

21. A computer program product comprising a computer program and a non-transitory computer readable medium on which the computer program is stored, the computer program comprising computer program code which, when run on a party challenging device for providing a challenge to a first terminal intending to communicate with a second terminal via at least one communication network, causes said party challenging device to:
receive a first electronic session initiation protocol (SIP) message concerning a transfer of media from the first terminal to the second terminal, said first electronic SIP message being sent from the first terminal associated with a first party and being addressed to the second terminal,
obtain communication contextual data associated with the first party or the first terminal, said communication contextual data comprising session type identifying data,
use the communication contextual data to determine whether the first terminal is seeking to engage the second terminal in an audio only communication session
select, based on the communication contextual data, a challenge message format from among a plurality of challenge message formats,
provide, in the selected challenge message format, an electronic challenge message based on the obtained communication contextual data, said electronic challenge message including a challenge to the first party, wherein the electronic challenge message is a message of the type completely automated public Turing-test to tell computers and humans apart (CAPTCHA), and
send said electronic challenge message to the first terminal, in order to enable a decision to be made how to process said first SIP electronic message for the second terminal based on correctness of an electronic response message received from the first terminal, wherein the electronic response message includes a response to the challenge provided in the electronic challenge message, wherein:
the first electronic SIP message is a session invitation message comprising a session type field storing session type information identifying a session type and a coding field storing coding information identifying a media coding type,
the contextual communication data comprises one or more of the session type information and the coding information, and
the instructions cause the device to use the communication contextual data to determine whether the first terminal is seeking to engage the second terminal in an audio only communication session by evaluating one or more of the session type information and the coding information to determine whether the first terminal is seeking to engage the second terminal in an audio only communication session.

22. The method of claim 1, wherein the session type identifying data indicates whether the transfer of media includes a voice call session or a video session, and wherein selecting the challenge message format comprises:

selecting an audio format as the challenge message format in response to a determination that the transfer of media includes a voice call session, wherein a challenge message in the audio format contains no text, image, or video; and selecting an image format, a text format, or a video format as the challenge message format in response to a determination that the transfer of media includes a video session.

23. The method of claim 1, wherein the step of selecting the challenge message format comprises:

determining a speed of the first party; and selecting the challenge message format based on whether the speed is above a speed threshold.

24. The method of claim 7, wherein the challenge presentation capability defining data indicates whether the first terminal includes at least one of a speaker, a display, and a vibrator.

25. The method of claim 24, wherein the challenge presentation capability defining data indicates that the first terminal includes a display and further indicates a size and resolution of the display.

26. The method of claim 24, wherein the challenge presentation capability defining data further indicates what challenge response input receiving unit is included in the first terminal.

27. The method of claim 26, wherein the challenge presentation capability defining data indicates whether the first terminal includes at last one of a keyboard, a keypad, a microphone, and a camera.

28. The method of claim 1, wherein selecting the challenge message format based on the communication contextual data consists of choosing one or more of: an audio message format, a video message format, an image message format, and a text message format based on the communication contextual data.

29. The method of claim 28, wherein the method further comprises using the communication contextual data to determine whether the first user is seeking to engage the second user in an audio only communication session, and the step of choosing one or more of: an audio message format, a video message format, an image message format, and a text message format based on the communication contextual data consists of choosing the audio message format in response to determining that the first user is seeking to engage the second user in an audio only communication session.

* * * * *